US009710285B2

United States Patent
Taniguchi

(10) Patent No.: US 9,710,285 B2
(45) Date of Patent: Jul. 18, 2017

(54) INFORMATION PROCESSING SYSTEM, MANAGEMENT APPARATUS, AND METHOD OF MANAGING A PLURALITY OF BOOT-UP PROGRAMS

(71) Applicant: FUJITSU LIMITED, Kawasaki-shi, Kanagawa (JP)

(72) Inventor: Hiroyuki Taniguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 125 days.

(21) Appl. No.: 14/571,344

(22) Filed: Dec. 16, 2014

(65) Prior Publication Data

US 2015/0220349 A1 Aug. 6, 2015

(30) Foreign Application Priority Data

Feb. 5, 2014 (JP) ................................ 2014-019988

(51) Int. Cl.
*G06F 9/00* (2006.01)
*G06F 9/44* (2006.01)
*G06F 9/445* (2006.01)

(52) U.S. Cl.
CPC ............ *G06F 9/4416* (2013.01); *G06F 8/665* (2013.01); *G06F 9/4401* (2013.01)

(58) Field of Classification Search
CPC ....... G06F 8/665; G06F 9/4401; G06F 9/4416
USPC .......... 709/222, 203; 713/1, 2; 717/107, 168
See application file for complete search history.

(56) References Cited

U.S. PATENT DOCUMENTS

| | | | | |
|---|---|---|---|---|
| 6,810,478 B1 * | 10/2004 | Anand | ................. | G06F 15/177 713/1 |
| 8,055,890 B2 * | 11/2011 | Yu | ....................... | G06F 11/1417 710/8 |
| 8,239,662 B1 * | 8/2012 | Nelson | ................. | G06F 9/4416 713/1 |
| 8,364,945 B2 * | 1/2013 | Ward | ................... | G06F 9/4416 370/356 |
| 8,544,016 B2 * | 9/2013 | Friedman | ............ | G06F 11/3664 717/107 |
| 2003/0005276 A1 * | 1/2003 | French | .................. | G06F 9/4416 713/2 |

(Continued)

FOREIGN PATENT DOCUMENTS

| | | |
|---|---|---|
| JP | 2003-051796 | 2/2003 |
| JP | 2004-118825 | 4/2004 |
| JP | 2006-72917 | 3/2006 |

*Primary Examiner* — Aurel Prifti
(74) *Attorney, Agent, or Firm* — Fujitsu Patent Center

(57) ABSTRACT

An information processing system including a plurality of information processing apparatuses and a management apparatus that manages a plurality of boot-up programs used to boot up the plurality of information processing apparatuses. The management apparatus includes a storage and a processor. The storage stores the plurality of boot-up programs. The processor executing a process including obtaining configuration information of a first information processing apparatus of the plurality of information processing apparatuses, selecting a boot-up program corresponding to the first information processing apparatus from the plurality of boot-up programs stored in the storage, based on the obtained configuration information, and sending the boot-up program selected by the selector to the first information processing apparatus.

18 Claims, 14 Drawing Sheets

(56) References Cited

U.S. PATENT DOCUMENTS

| | | | |
|---|---|---|---|
| 2003/0126242 A1* | 7/2003 | Chang | G06F 9/4416 709/222 |
| 2004/0059859 A1 | 3/2004 | Chheda | |
| 2005/0160256 A1* | 7/2005 | Huang | G06F 9/4416 713/2 |
| 2006/0242228 A1* | 10/2006 | Eggers | H04L 29/06 709/203 |
| 2009/0198805 A1* | 8/2009 | Ben-Shaul | G06F 9/4416 709/222 |
| 2009/0320012 A1* | 12/2009 | Lee | G06F 8/65 717/168 |
| 2010/0199078 A1* | 8/2010 | Shih | G06F 8/65 713/2 |
| 2013/0254521 A1* | 9/2013 | Bealkowski | G06F 9/445 713/2 |

* cited by examiner

FIG. 1
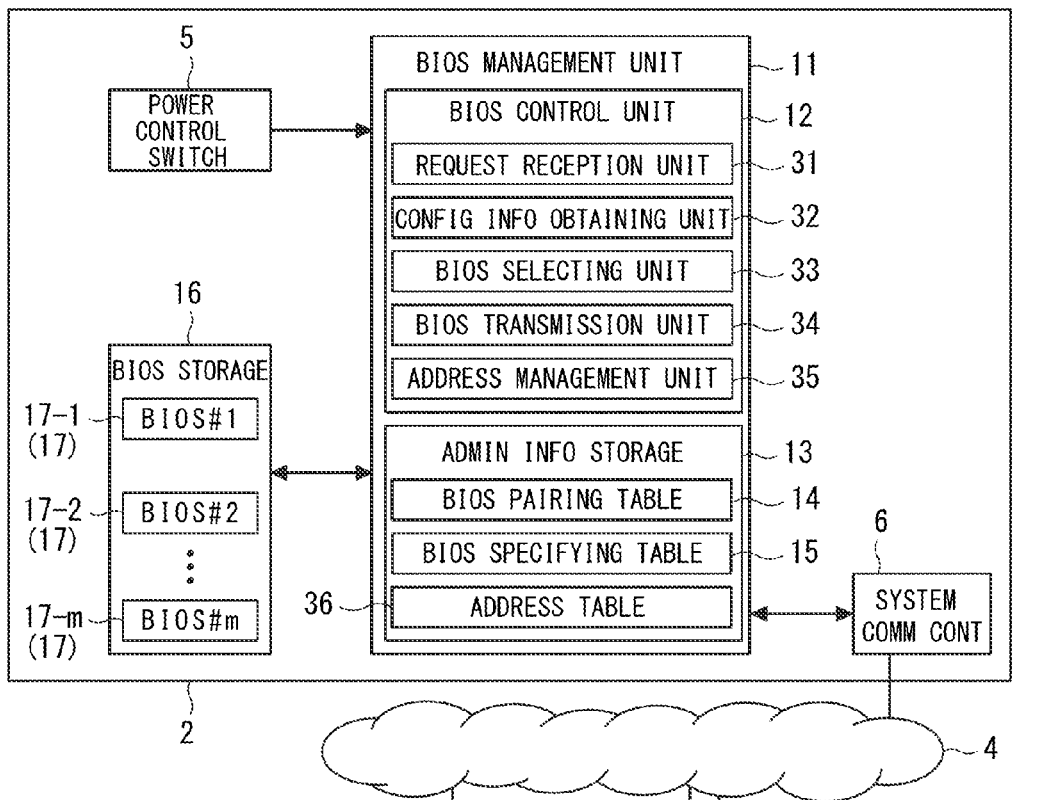
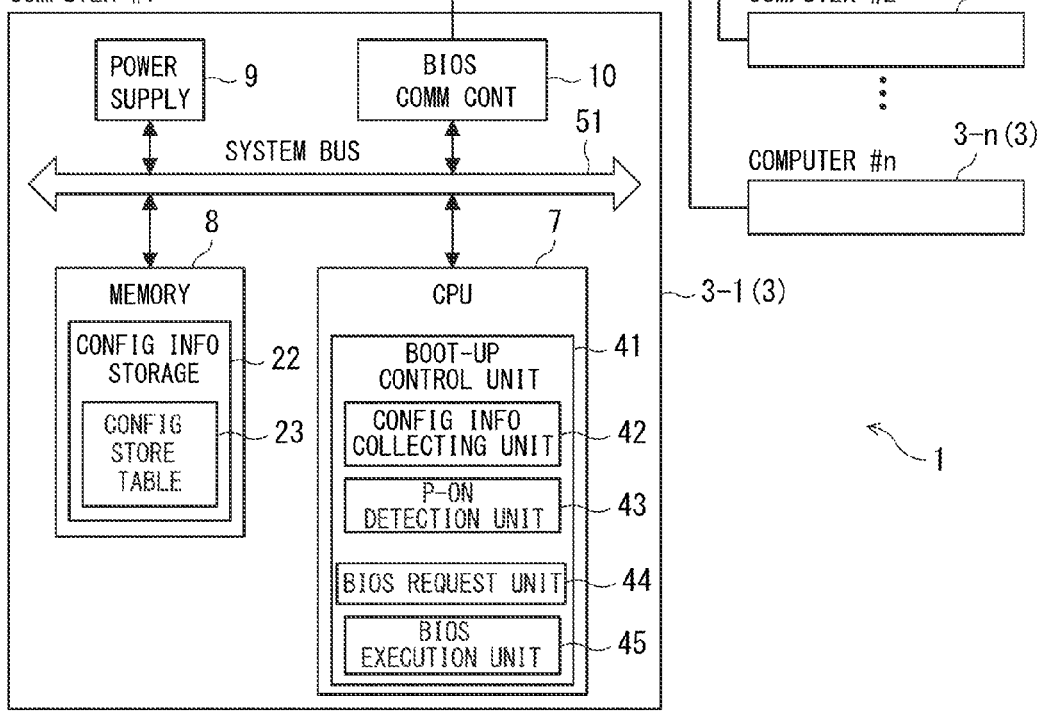

FIG. 3

| ROW ID | BIOS ID | BOARD ID | CPU | MEMORY | EXTENSION DEVICE |
|---|---|---|---|---|---|
| WEIGHT |  | 10 | 10 | 5 |  |
| 1 | 1 | 100 | * | * | * |
| 2 | 2 | 200 | * | * | * |
| 3 | 3 | 300 | A | * | DEVICE 1 |
| 4 | 4 | 300 | B | * | DEVICE 2 |

FIG. 7

| BOARD ID | CPU #1 | CPU #2 | MEMORY | SLOT #1 | SLOT #2 | SLOT #3 | SLOT #4 |
|---|---|---|---|---|---|---|---|
| 100 | A | A | 16G | LAN | – | – | – |

| ROW ID | BIOS ID | BOARD ID | CPU #1 | CPU #2 | MEMORY | SLOT #1 | SLOT #2 | SLOT #3 | SLOT #4 |
|---|---|---|---|---|---|---|---|---|---|
| WEIGHT |  | 10 | 10 | 10 | 1 | 5 | 1 | 1 | 1 |
| 1 | 1 | 100 | A | * | * | LAN | * | * | * |
| 2 | 2 | 100 | A | * | * | * | * | * | * |
| 3 | 2 | 100 | B | B | * | * | * | * | * |
| 4 | 3 | 100 | C | C | * | * | * | * | * |

INFORMATION PROCESSING SYSTEM, MANAGEMENT APPARATUS, AND METHOD OF MANAGING A PLURALITY OF BOOT-UP PROGRAMS

CROSS-REFERENCE TO RELATED APPLICATION

This application is based upon and claims the benefit of priority of the prior Japanese Patent application No. 2014-019988, filed on Feb. 5, 2014, the entire contents of which are incorporated herein by reference.

FIELD

The embodiments discussed herein are related to an information processing system, a management apparatus, and a method of controlling programs.

BACKGROUND

Generally, a typical computer has, on one motherboard, a central processing unit (CPU) and a read-only memory (ROM), such as an erasable programmable ROM (EPROM) or an electrically erasable programmable ROM (EEPROM), which contains a basic input/output system (BIOS) program.

BIOS programs are programs that control inputs and outputs in hardware in computers at the lowest level when the computers are booted up. One computer is provided with one or more BIOS programs. BIOS programs initialize hardware components in the computer, such as a CPU, a memory, a hard disk drive (HDD), and option cards, and call a boot loader.

Hereinafter, for the sake of brevity, BIOS programs are also referred to as the BIOSes.

In a single computer provided with a plurality of BIOSes, a management table is used to specify which one of the BIOSes is to be used (loaded) for booting up that computer. Which BIOS is to be used is set by a system administrator, based on a configuration of hardware in the computer and the like.

In a computer provided with a plurality of BIOSes, upon a power-on, a CPU is reset and a BIOS to be loaded is then identified, based on a management table. The identified BIOS is then read from a ROM, and the BIOS is started. The CPU then accesses components on a motherboard in accordance with the BIOS, and a boot-up process is executed on the computer.

Upon update of BIOSes on computers, a BIOS update program is executed on each of the computers.

In a large-scale information processing system wherein dozens to hundreds of computers are present, executing a BIOS update program on the respective computers is quite annoying.

Some techniques for simplifying update of BIOSes have been proposed, wherein programs and setting information are distributed from a management server to all of target computers for achieving automatic update of a BIOS.

With such techniques, however, a system administrator has to check hardware configurations of the respective target computers, such as types of the computers, and CPUs, memory devices, extension cards, etc., which are present in those computers. Based on the configuration information, the system administrator generates setting for the automatic update of the BIOS.

Additionally, after update of a BIOS is completed on the plurality of computers is updated from the management server, the computers need to be shut off, in order to activate the update of the BIOS on the computers.

SUMMARY

Accordingly, an information processing system is provided, including: a plurality of information processing apparatuses; and a management apparatus that manages a plurality of boot-up programs used to boot up the plurality of information processing apparatuses, the management apparatus including: a storage that stores the plurality of boot-up programs; a configuration information obtaining unit that obtains configuration information of a first information processing apparatus of the plurality of information processing apparatuses; a selector that selects a boot-up program corresponding to the first information processing apparatus from the plurality of boot-up programs stored in the storage, based on the obtained configuration information; and a transmitter that sends the boot-up program selected by the selector to the first information processing apparatus.

Furthermore, a management apparatus that manages a plurality of boot-up programs used to boot up a plurality of information processing apparatuses, the management apparatus including: a storage that stores the plurality of boot-up programs; a configuration information obtaining unit that obtains configuration information of a first information processing apparatus of the plurality of information processing apparatuses; a selector that selects a boot-up program corresponding to the first information processing apparatus from the plurality of boot-up programs stored in the storage, based on the obtained configuration information; and a transmitter that sends the boot-up program selected by the selector to the first information processing apparatus.

Furthermore, a method of managing a plurality of boot-up programs used to boot up a plurality of information processing apparatuses, is provided, the method including: obtaining configuration information of a first information processing apparatus of the plurality of information processing apparatuses; selecting a boot-up program corresponding to the first information processing apparatus from the plurality of boot-up programs, based on the obtained configuration information; and sending the selected boot-up program to the first information processing apparatus.

The object and advantages of the invention will be realized and attained by means of the elements and pairs particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a schematic diagram illustrating a configuration of an information processing system as an example of a first embodiment;

FIG. 3 is a diagram illustrating an example of a BIOS selection table as an example of the first embodiment;

FIG. 7 is a diagram illustrating hardware configurations of computers in a table format, as an example of the first embodiment an example;

DESCRIPTION OF THE PREFERRED EMBODIMENTS

Figure 2:
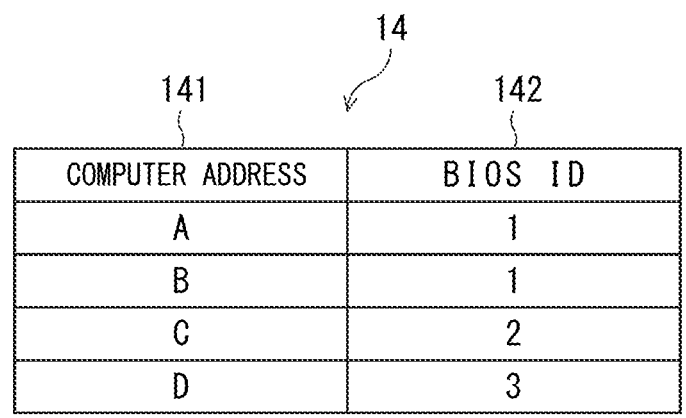
FIG. 2 is a diagram illustrating an example of a BIOS pairing table as an example of the first embodiment.

Hereinafter, an information processing system, a management apparatus, and a method of controlling programs according to exemplary embodiments, will be described with reference to drawings. However, the following exemplary embodiments are merely illustrative, and not intended to exclude various modifications and applications of the techniques that are not specified in the embodiments. That is, the embodiments may be modified in various ways (for example, pair of embodiments and each modification) and implemented without departing from the spirit and scope of the invention.

(A) First Embodiment

FIG. 1 is a schematic diagram illustrating a configuration of an information processing system 1 as an example of a first embodiment.

In this information processing system 1, a BIOS server (management apparatus) 2 is communicatively connected to computers (information processing apparatuses) 3-1 to 3-n (n is an integer of 2 or more), via communication links 4, such as local area network (LAN) or Internet Small Computer System Interface (iSCSI) links.

Note that, hereinafter, when referring to reference symbols 3-1 through 3-n will be used when a reference is made to a particular one of a plurality of computers, while reference symbol 3 is used when referring to any one of the computers. The computers 3-1 to 3-n are also referred to as computers #1 through #n, respectively.

The BIOS server 2 is a computer having a server function, for example, and includes a CPU and a memory (both not illustrated), a power control switch 5, and a system communication controller 6.

The power control switch 5 is a switch which may be operated by a system administrator of the information processing system 1, for remotely controlling power supply units 9 (described later) in the computers 3. In response to being operated by the system administrator, the power control switch 5 sends a control signal (power on or power off signal) to a computer 3 through the communication link 4, for example.

Any of known remote control switches may be used as the power control switch 5.

The system communication controller 6 is an interface that establishes communications with BIOS communication controllers 10 in the computers 3 through the communication link 4.

An address management unit 35 (described later) in the BIOS server 2 has a function as a dynamic host configuration protocol (DHCP) server, and determines addresses to be assigned (given) to the computers 3, using an address table 36 (described later).

An address (e.g., an internet protocol (IP) address) of the BIOS server 2 set in advance in a time server (not illustrated), for example, and that time server notifies the computers 3 of the address of the time server.

Specifically, the computers 3 accesses the time server using the address of the time server notified by the time server, and obtains the IP address of the BIOS server 2.

Thereafter, the computers 3 connect to the BIOS server 2, using the IP address of the BIOS server 2. Upon the connections, the address management unit 35 as a DHCP server provides the computers 3 of their addresses, and communications are established between the computers 3 and the BIOS server 2.

The system communication controller 6 communicates with BIOS communication controllers 10 in the computers 3. For example, through the BIOS communication controller 10, the system communication controller 6 sends BIOSes 17 and control signals (power-on and power-off signals, etc.) to the BIOS management units 11 in the computers 3, and receives data from the BIOS communication controller 10. The system communication controller 6 also receives, from each of the computers 3, through the BIOS communication controller 10, various types of information, such as information about the computers 3 (e.g., configuration information).

The BIOS server 2 also includes a BIOS management unit 11 and a BIOS storage 16.

The BIOS storage 16 stores BIOS programs (boot-up programs) 17-1 to 17-m (m is an integer of 2 or more). Any of known ROMs, such as EPROMs and EEPROMs, hard disk drives (HDDs), and solid state drives (SSDs) may be used as the BIOS storage 16, for example.

The BIOS programs 17-1 to 17-m are programs that control inputs and outputs in hardware in the computers 3 at the lowest level when the computers 3-1 to 3-n are booted up.

Hereinafter, for the sake of brevity, the BIOS programs 17-1 to 17-m are also referred to as the BIOSes 17-1 to 17-m.

Note that, hereinafter, when referring to reference symbols 17-1 to 17-m will be used when a reference is made to a particular one of a plurality of BIOSes, while reference symbol 17 is used when referring to any one of the BIOSes. The BIOSes 17-1 to 17-m are also referred to as BIOSes #1 to #m, respectively.

In an example of this first embodiment, the BIOSes 17 are not permanently stored in the computers 3, but are obtained from the BIOS server 2 when the computers 3 are powered on, to carry out a boot-up process on the computers 3.

The computer 3-1 includes a CPU 7, a memory 8, a power supply 9, and a BIOS communication controller 10, which are connected each other by a system bus 51. Since the computers 3-2 to 3-n have configurations and functions that are similar to those of the computer 3-1, and description and illustration of the configurations and functions of the computers 3-2 to 3-*n* are omitted.

The CPU 7 is a processing apparatus that performs various types of controls and computations, and embodies various functions in the computer 3 by executing an operating system (OS) and programs.

The memory 8 temporarily stores programs executed by the CPU 7, various types of data, data obtained in operations of the CPU 7. Any known random access memory (RAM) may be used as the memory 8, for example. The memory 8 also functions as a configuration information storage 22 (described later).

The power supply 9 is a power switch of the computer 3. In an example of this embodiment, when a power cable (not illustrated) of a computer 3 is plugged into an AC wall outlet, for example, the computer 3 is placed into a power standby mode. In the power standby mode, the computer 3 is not operated, but power is supplied to some of components, such as the BIOS communication controller 10, for example, waiting for a remote power-on command from the power control switch 5 in the BIOS server 2.

When a user wants to use a computer 3 which has been placed into a power standby mode, the computer 3 is powered on from the power control switch 5 in the BIOS server 2, to activate the computer 3. Alternatively, the computer 3 may be activated by the user through an operation of a switch of the power supply 9, when the computer 3 is in the power standby mode.

The BIOS communication controller 10 is an interface that establishes communications with the system communication controller 6 in the BIOS server 2 through the communication link 4. For example, the BIOS communication controller 10 sends, to a BIOS management unit 11 (described later) via system communication controller 6, configuration information of hardware components in the computer 3, which is stored in the configuration information storage 22.

In this information processing system 1, when any of the computers 3-1 to 3-*n* is powered on through an operation of the power control switch 5 in the BIOS server 2 or a user operation of the power supply 9, that computer 3 sends a BIOS sending request to the BIOS server 2. In response to the BIOS server 2 receiving the BIOS sending request, the BIOS management unit 11 in the BIOS server 2 selects a BIOS program 17 that is suitable to the computer 3 that has sent the BIOS sending request, and sends the BIOS program 17 to the requesting computer 3. The computer 3 then boots up with the received BIOS program 17.

For this purpose, the BIOS management unit 11 includes a BIOS control unit 12 and an administration information storage 13. The administration information storage 13 includes a BIOS pairing table 14, a BIOS specifying table 15, and an address table 36.

The BIOS control unit 12 includes a request reception unit (receiver) 31, a configuration information obtaining unit 32, a BIOS selecting unit (selector) 33, a BIOS transmission unit (transmitter) 34, and an address management unit 35.

The request reception unit 31 receives a BIOS sending request from a computer 3 that has just been powered on.

The configuration information obtaining unit 32 requests a boot-up control unit 41 (described later) in that computer 3, to send configuration information of the requesting computer 3.

The BIOS selecting unit 33 selects a BIOS 17 assigned to the computer 3 that has sent the BIOS sending request, using the BIOS pairing table 14 in the administration information storage 13. If no BIOS 17 for that computer 3 has been recorded in the BIOS pairing table 14, the BIOS selecting unit 33 identifies the most suitable BIOS 17 from the BIOSes 17 in the BIOS storage 16. For this, the BIOS selecting unit 33 compares configuration information of the computer 3 obtained by the configuration information obtaining unit 32 against entries in the BIOS specifying table 15 to identify which BIOS 17 is the most suitable to that particular computer 3. The BIOS selecting unit 33 then adds a pair of the identified BIOS 17 and the address of the computers 3, to the BIOS pairing table 14. Such a BIOS identifying process by the BIOS selecting unit 33 will be described later with reference to FIG. 6.

The BIOS transmission unit 34 instructs the system communication controller 6 to send the BIOS 17 selected by the BIOS selecting unit 33 to the computer 3 that sent the BIOS sending request.

The address management unit 35 also has a function as a DHCP server, and assigns a free address that is to be unique throughout the information processing system 1, to the computer 3, by looking up the address table 36.

As described above, an address (e.g., an IP address) of the BIOS server 2 set in advance in a time server (not illustrated), for example, and that time server notifies the computers 3 of the address of the time server.

The computer 3 accesses the time server using the address of the time server notified by the time server, and obtains the IP address of the BIOS server 2.

Thereafter, the computer 3 connects to the BIOS server 2, using the IP address of the BIOS server 2. Upon the connections, the address management unit 35 as a DHCP server provides the computer 3 with its address, and communications are established between the computer 3 and the BIOS server 2.

The BIOS pairing table 14 is a table that stores pairs, each pair including a computer and a BIOS 17 assigned to that computer 3.

FIG. 2 is a diagram illustrating an example of the BIOS pairing table 14 as an example of the first embodiment.

The BIOS pairing table 14 includes a computer address column 141 and a BIOS identifier (ID) column 142, which are related to each other.

The computer address column 141 stores an address of a computer 3, which is assigned by the address management unit 35, for uniquely identifying that computer 3. An IP address of the computer 3 may be used as the address of the computer 3, for example.

The BIOS ID column 142 stores identification information (an ID or the like) that uniquely identifies a BIOS 17 assigned to the corresponding computer 3.

The BIOS specifying table 15 is a table that stores pairs, each pair including a BIOS 17, and hardware pair of a computer 3 (a motherboard, a CPU, a memory, extension devices, etc.) corresponding to the BIOS 17. The BIOS specifying table 15 stores information that is used by the BIOS selecting unit 33 to select a BIOS 17 suitable to that computer 3, based on configuration information of the computer 3.

FIG. 3 is a diagram illustrating an example of the BIOS specifying table 15 as an example of the first embodiment.

The BIOS specifying table 15 includes a row ID column 150, a BIOS ID column 151, a board ID column 152, a CPU column 153, a memory column 155, and an extension device column 156, which are related to each other.

The row ID column 150 stores identification information (a row number or the like) that uniquely identifies each row (entry) in the BIOS specifying table 15.

The BIOS ID column 151 stores identification information (an ID or the like) that uniquely identifies a BIOS 17. In the example depicted in FIG. 3, either one of values "1", "2", "3", and "4" is set to the BIOS ID column 151.

The board ID column 152 stores a value (an ID or the like) that uniquely identifies a motherboard (not illustrated) in the computer 3 corresponding to the BIOS 17 indicated by the value in the BIOS ID column 151. In the example depicted in FIG. 3, either one of values "100", "200", and "300" is set to the board ID column 152.

The CPU column 153 stores a value (an ID or the like) that uniquely identifies a CPU 7 in the computer 3 corresponding to the BIOS 17 indicated by the value in the BIOS ID column 151. A value "*" (wild card) in the CPU column 153 indicates that any of CPUs 7 may be applied. A plurality of CPU columns 153 may be provided in a single BIOS specifying table 15. For example, in an alternative BIOS specifying table 15 depicted in FIG. 8, two CPU columns, namely, CPU #1 153 and CPU #2 154, are provided.

The memory column 155 stores a value (an ID or the like) that uniquely identifies a memory 8 in the computer 3 corresponding to the BIOS 17 indicated by the value in the BIOS ID column 151. A value "*" (wild card) in the memory column 155 indicates that any of memories 8 may be applied.

The extension device column 156 stores a value (an ID or the like) that uniquely identifies an extension device (an extension board or the like, which is not illustrated) in the computer 3 corresponding to the BIOS 17 indicated by the value in the BIOS ID column 151. A value "*" (wild card) in the extension device column 156 indicates that any of extension devices may be applied. A plurality of extension device columns 156 may be provided in a single BIOS specifying table 15. For example, in the alternative BIOS specifying table 15 depicted in FIG. 8, four extension device columns, namely, Slot #1 to #4 156 to 159, are provided.

The BIOS specifying table 15 also stores weight values which have been set in advance by a system administrator, for respective hardware components. The weights are used by the BIOS selecting unit 33 for calculation of a weight sum that represents the extent how much (similarity) the hardware configuration of a computer 3 matches with existing configurations. Calculation of the weight sum will be described later with reference to FIGS. 6 to 8.

The address table 36 is a table that contains all of information processing apparatuses (the BIOS server 2, the computers 3, etc.) and all switches (not illustrated) present in the information processing system 1, and addresses that have not been used (are free) in the information processing system 1. The address table 36 is looked up by an address management unit 35 (described later) for supplying an address to a computer 3. The address management unit 35 can know which addresses have been assigned to computer 3 and which addresses have not been used yet.

Furthermore, a CPU 7 functions as a boot-up control unit 41, by executing a boot-up management program (not illustrated).

When a computer 3 is powered on, the boot-up control unit 41 requests a BIOS 17 for booting up the computer 3 to the BIOS server 2, and starts the computer 3 using a BIOS 17 sent from the BIOS server 2.

For this purpose, the boot-up control unit 41 includes a configuration information collecting unit 42, a P-ON detection unit 43, a BIOS request unit 44, and a BIOS execution unit 45.

The configuration information collecting unit 42 obtains configuration information for hardware components (a motherboard, a CPU, a memory, an extension device, etc.) in the computer 3, and writes it into a configuration store table 23 (described later) in the configuration information storage 22.

The P-ON detection unit 43 detects that the computer 3 is powered on, when a power-on signal is received from the BIOS server 2, or when a user operates a switch of the power supply 9 in the computer 3.

The BIOS request unit 44 sends a BIOS sending request to the BIOS server 2, in response to the P-ON detection unit 43 detecting that the computer 3 is powered on. Then, when the configuration information is requested to the BIOS request unit 44 is requested from the BIOS server 2, the configuration information collecting unit 42 sends the obtained configuration information to the BIOS server 2.

The BIOS execution unit 45 receives a BIOS 17 from the BIOS server 2, and starts boot-up of the computer 3 by executing the BIOS 17.

The configuration information storage 22 includes a configuration store table 23. The configuration store table 23 is a table that contains information on hardware components (hardware) present in that computer 3. Any of well-known configuration tables of the computers 3 may be used as the configuration store table 23, and detailed description thereof is omitted.

Next, operations of the information processing system 1 will be described with reference to FIGS. 4 to 8.

Figure 4:
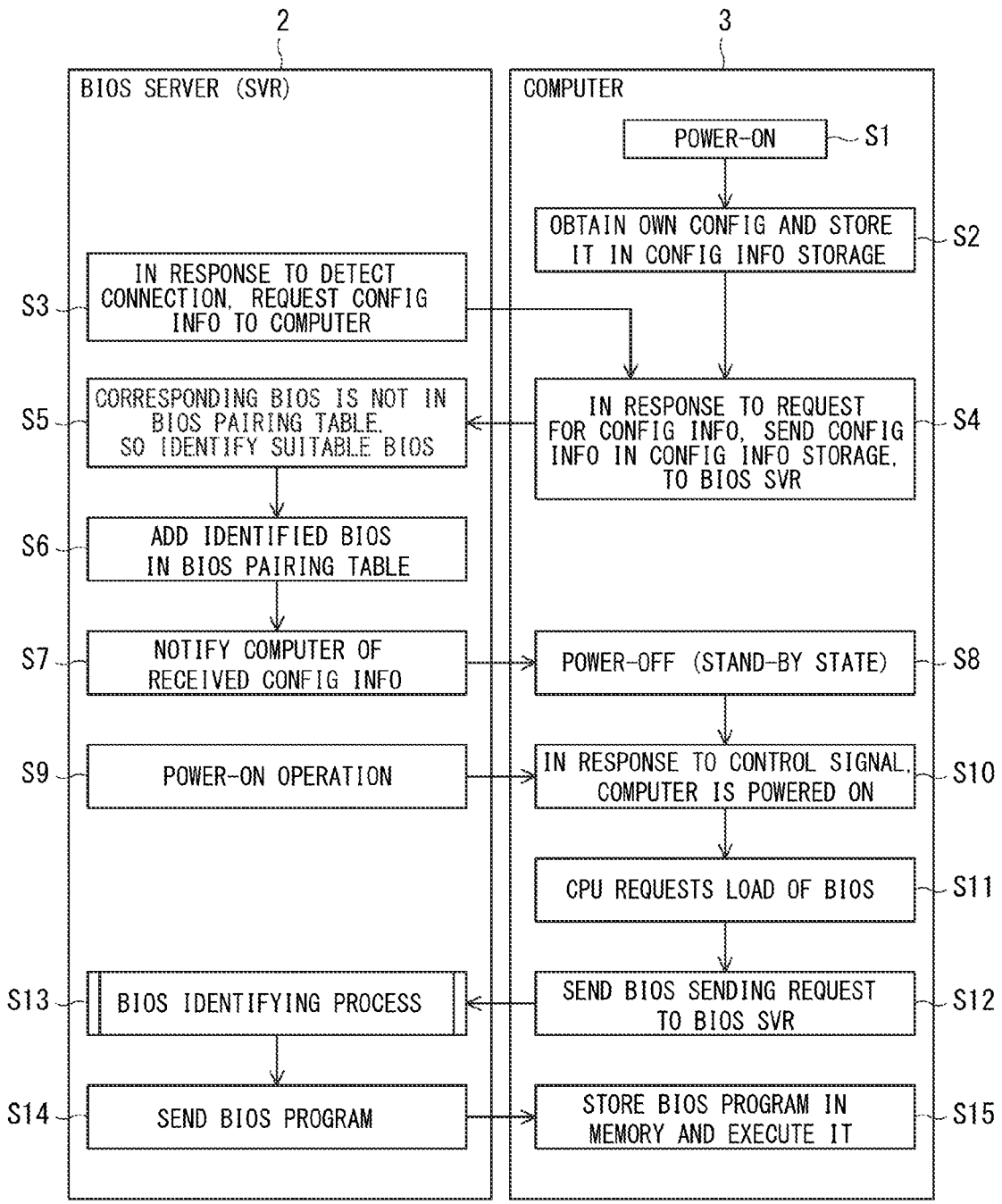
FIG. 4 is a flowchart of a process at the time when a computer is newly added in the information processing system, as an example of the first embodiment.

FIG. 4 is a flowchart (Steps S1 to S15) of a process at the time when a computer 3 is newly added in the information processing system 1, as an example of the first embodiment.

This process is executed when a computer 3 is newly connected to the BIOS server 2. For example, this processes is executed when a new computer 3 is connected to the BIOS server 2 for the first time, or when a computer 3 which was connected to one BIOS server 2 is connected to another BIOS server 2.

In Step S1, a power cable of a new computer 3 is plugged into a wall AC outlet, and power is supplied to that computer 3. The computer 3 is then connected to the BIOS server 2. At this time, the address management unit 35 selects one free address for the computer 3, by looking up the address table 36, and informs the computer 3 of that address.

Next, in Step S2, the configuration information collecting unit 42 obtains configuration information for the hardware (motherboard, CPU, connected devices, etc.) in the computer 3, and generates a configuration store table 23. The configuration information collecting unit 42 then stores the generated configuration store table 23 into the configuration information storage 22. Alternatively, the configuration information may be obtained by a baseboard management controller (BMC, which is not illustrated) in the computer 3.

In the meantime, in Step S3, the system communication controller 6 in the BIOS server 2 detects that the new computer 3 was connected to the BIOS server 2. The configuration information obtaining unit 32 in the BIOS server 2 then requests the configuration information to that computer 3.

In Step S4, the configuration information collected by the configuration information collecting unit 42 in the computer 3 is sent.

In Step S5, the BIOS server 2 receives the configuration information from the computer 3.

In this case, since the computer 3 was added to the BIOS server 2 for the first time, any BIOS 7 assigned to that computer 3 has not been recorded in the BIOS pairing table 14 yet. Hence, the BIOS selecting unit 33 selects (identifies) a BIOS 7 to be assigned to the new computer 3 by executing a BIOS identifying process. The BIOS identifying process will be described later with reference to FIG. 6.

In Step S6, the BIOS selecting unit 33 adds (records) a pair of the identified BIOS 7 and the computer 3, to the BIOS pairing table 14.

Next, in Step S7, the BIOS selecting unit 33 sends a configuration information received notification to the newly connected computer 3. For example, as the configuration information received notification, the BIOS selecting unit 33 sends the address that was selected by the address management unit 35 and was sent to the computer 3 in Step S1. In this step, the BIOS selecting unit 33 may send any information other than the address of the computer 3 to the computer 3, as the configuration information received notification.

In Step S8, a power-off signal is sent from the BIOS server 2 to place the computer 3 into the power standby mode, and communications between the system communication controller 6 and the BIOS communication controller 10 are terminated.

Thereafter, in Step S9, the system administrator operates the power control switch 5 in the BIOS server 2, for example, to power on the computer 3. In response, a power-on signal is sent from the system communication controller 6 to the computer 3.

In response to the power-on signal being sent from the BIOS server 2 in Step S9, in Step S10, the power supply 9 in the computer 3 is remotely tuned on, thereby powering on the computer 3.

In Step S11, the CPU 7 in the computer 3 tries to load a BIOS without knowing that no BIOS is present in the computer 3.

In Step S12, the BIOS request unit 44 in the boot-up control unit 41 sends a BIOS sending request to the BIOS server 2.

In response to receiving the BIOS sending request from the computer 3, in Step S13, the BIOS control unit 12 executes a BIOS identifying process. The BIOS identifying process will be described later with reference to FIG. 6.

In Step S14, the BIOS selecting unit 33 reads the BIOS 17 selected in Step S13 from the BIOS storage 16, and the BIOS transmission unit 34 instructs the system communication controller 10 to send the read BIOS 17 to the computer 3.

In Step S15, the BIOS execution unit 45 in the boot-up control unit 41 temporarily stores the BIOS 17 sent from the BIOS server 2 into the memory 8, and executes the BIOS 17. The BIOS 17 then executes a check and an initialization on the computer 3, in accordance with programs in it. Thereafter, the CPU 7 loads the OS and other programs to execute a boot-up process on the computer 3.

The boot-up process on the computer 3 will be described next.

Figure 5:
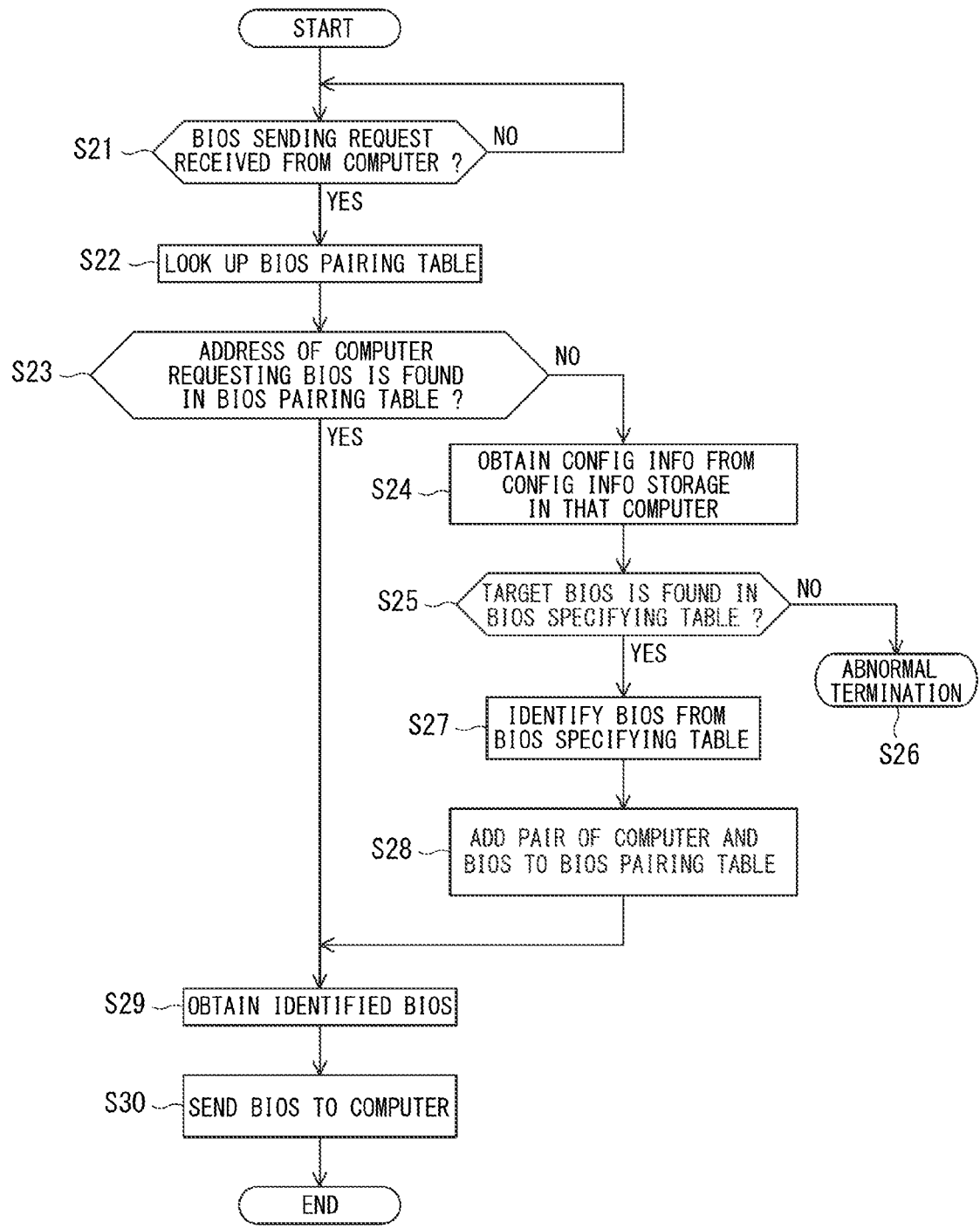
FIG. 5 is a flowchart of a process by a BIOS server upon a boot-up of a computer as an example of the first embodiment.

FIG. 5 is a flowchart (Steps S21 to S30) of a process by the BIOS server 2 upon a boot-up of a computer 3 as an example of the first embodiment.

The BIOS control unit 12 waits for a BIOS sending request from a computer 3, and determines whether or not a BIOS sending request is received from any of the computers 3 at every certain interval.

If no BIOS sending request is received from any of the computers 3 (refer to the NO route from Step S21), the BIOS control unit 12 returns to Step S21 for waiting for a BIOS sending request again.

Otherwise, if a BIOS sending request is received from a computer 3 (refer to the YES route from Step S21), in Step S22, the BIOS selecting unit 33 in the BIOS control unit 12 looks up the BIOS pairing table 14.

In Step S23, the BIOS selecting unit 33 checks whether or not the address of the computer 3 that has sent the BIOS sending request is found in the computer address column 141 in the BIOS pairing table 14.

If the address of the computer 3 is found in the BIOS pairing table 14 (refer to the YES route from Step S23), the flow moves to Step S29 (described later).

Otherwise, if the address of the computer 3 is not found in the BIOS pairing table 14 (refer to the NO route from Step S23), in Step S24, the configuration information obtaining unit 32 requests configuration information, to the computer 3 that has sent the BIOS sending request. In response, the configuration information collecting unit 42 in the boot-up control unit 41 in the computer 3 reads configuration information from the configuration store table 23 in the configuration information storage 22, and sends it to the configuration information obtaining unit 32.

In Step S25, the BIOS selecting unit 33 determines whether or not an entry corresponding to the configuration information of the computer 3, obtained by the configuration information obtaining unit 32 in Step S24, is found in the BIOS specifying table 15.

Upon making the determination, the BIOS selecting unit 33 executes a BIOS identifying process which will be described later with reference to FIG. 6, for identifying a BIOS 17 that is the most suitable to the computer 3, using the configuration information received from the computer 3 and the BIOS specifying table 15.

If any entry corresponding to the configuration information of the computer 3 is not found in the BIOS specifying table 15 (refer to the NO route from Step S25), in Step S26, the BIOS selecting unit 33 terminates this process as an abnormal termination. Additionally, the BIOS selecting unit 33 notifies a system administrator of the information processing system 1 that no BIOS 17 corresponding to the configuration information of the computer 3 is found in the BIOS specifying table 15, by displaying a massage, for example. In response, the system administrator stores a suitable BIOS 17 to the new computer 3 into the BIOS storage 16, and then records a pair of the configuration information of the computer 3 and the identifier of the BIOS 17, in the BIOS specifying table 15, for example.

Otherwise, if an entry corresponding to the configuration information of the computer 3 is found in the BIOS specifying table 15 (refer to the YES route from Step S25), in Step S27, the BIOS selecting unit 33 identifies the BIOS 17 found in the BIOS specifying table 15, as the BIOS 17 to be assigned to the computer 3.

Then, in Step S28, the BIOS selecting unit 33 records a pair of the computer 3 and the identified BIOS 17, in the BIOS pairing table 14.

Next, in Step S29, the BIOS transmission unit 34 reads the BIOS 17 identified by the BIOS selecting unit 33, from the BIOS storage 16.

In Step S30, the BIOS transmission unit 34 instructs the system communication controller 10 to send the BIOS 17 read in Step S29, to the computer 3.

Figure 6:
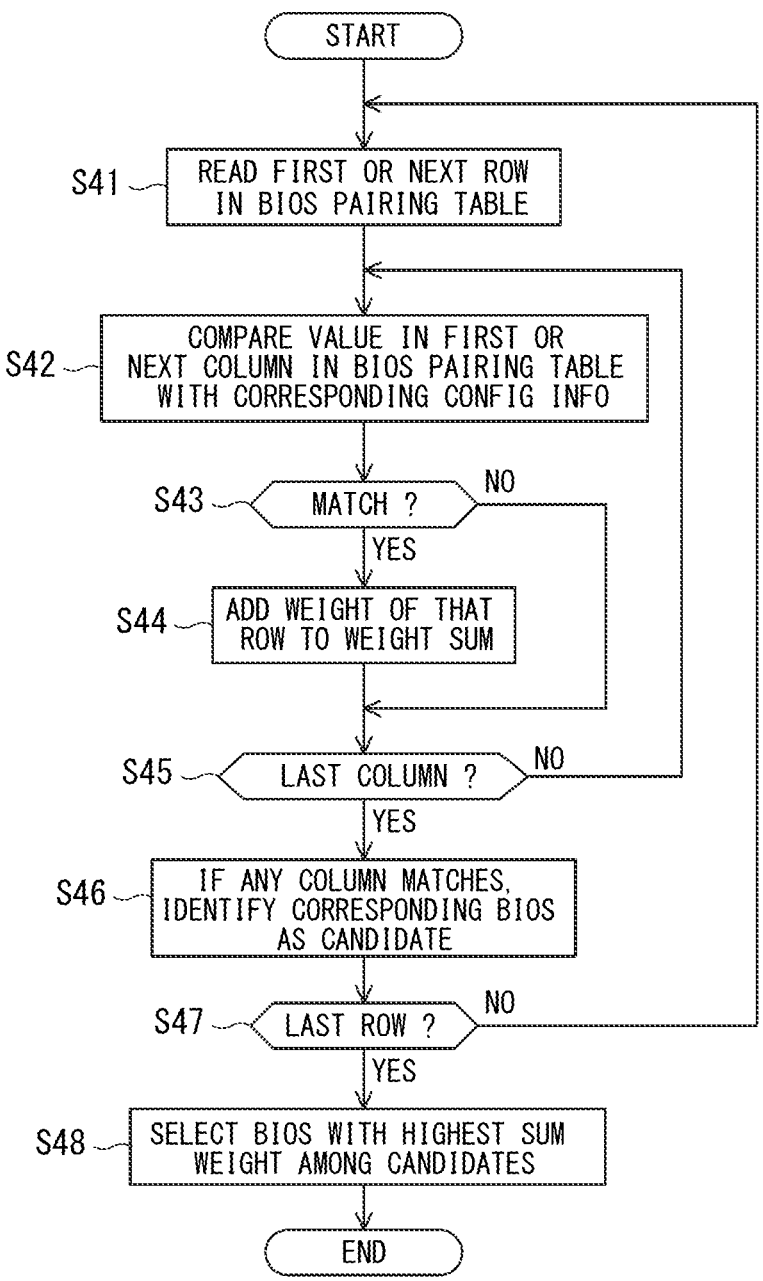
FIG. 6 is a flowchart of a BIOS identifying process by a BIOS selecting unit as an example of the first embodiment.

FIG. 6 is a flowchart of a BIOS identifying process (Steps S41 to S48) by the BIOS selecting unit 33 as an example of the first embodiment.

In this BIOS identifying process, the BIOS selecting unit 33 compares each entry in the BIOS pairing table 15, against configuration information of a computer 3.

In Step S41, the BIOS selecting unit 33 reads the first row (entry) in the BIOS pairing table 15.

Next, in Step S42, the BIOS selecting unit 33 compares the value in the first column in the row read in Step S41 in the BIOS pairing table 15, against its corresponding configuration information of the computer 3.

Then, in Step S43, the BIOS selecting unit 33 determines whether or not the values match in Step S42.

Figure 8:
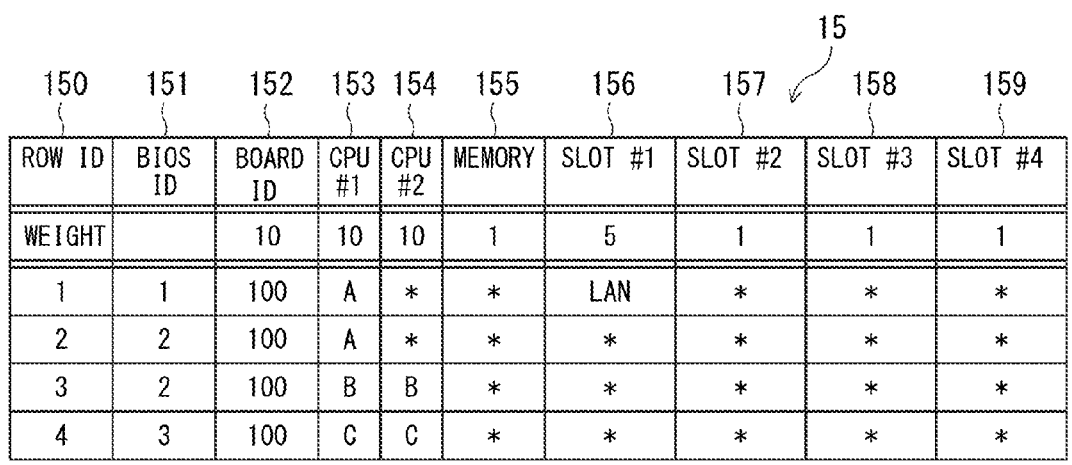
FIG. 8 is a diagram illustrating an example of the BIOS pairing table as an example of the first embodiment.

In this example, a user wants to boot up a computer 3 with a hardware configuration listed in FIG. 7, and the BIOS specifying table 15 has entries illustrated in FIG. 8.

In the exemplary BIOS pairing table 15 in FIG. 8, the first row with the row column ID 150 of "1" has the board ID column 152 of "100". This value matches the board ID="100" in FIG. 7, and the BIOS selecting unit 33 determines that there is a match. If "*" is set in any column in the BIOS pairing table 15, the BIOS selecting unit 33 determines that there is a match, for any hardware type of a column with a value of "*".

If the values do not match (refer to the NO route from Step S43), the flow moves to Step S45.

Otherwise, if the values match (refer to the YES route from Step S43), in Step S44, the BIOS selecting unit 33 adds the weight in the value in the corresponding column in the BIOS pairing table 15, to a weight sum. The weight sum is a value that represents the extent of matching (similarity) of the hardware configuration of a computer 3 with existing configurations, and is calculated by summing up the weights of matched hardware components. For example, the weight sum is increased as the similarity in the hardware configuration increases. An example of calculation of a weight sum will be described later with reference to FIGS. 7 and 8.

Next, in Step S45, the BIOS selecting unit 33 determines whether or not the last column in the row read in Step S41 has been read.

If the last column has not been read (refer to the NO route from Step S45), the BIOS selecting unit 33 returns to Step S42 and repeats Steps S42 to S45 for the next column in the row read in Step S41.

If the last column has been read (refer to the YES route from Step S45), in Step S46, the BIOS selecting unit 33 selects the BIOS 17 indicated by a BIOS ID column 151 in a row having any matched column(s), as a candidate BIOS.

Next, in Step S47, the BIOS selecting unit 33 determines whether or not the last row in the BIOS pairing table 15 has been read.

If the last row has not been read (refer to the NO route from Step S47), the BIOS selecting unit 33 returns to Step S41, for reading the next row in the BIOS pairing table 15 to repeat Steps S41 to S47 on that row.

If the last row has been read (refer to the YES route from Step S47), in Step S48, the BIOS selecting unit 33 picks up the BIOS 17 having the highest weight sum, from the candidate BIOS 17.

In the example in FIG. 8, in the entry with row column ID 150="1", the board ID column 152 ("100"), the CPU #1 column ("A"), and the Slot #1 column ("LAN") match the configurations listed in FIG. 7.

In the entry with row column ID 150="2", the board ID column 152 ("100") and the CPU #1 column ("A") match the configurations in FIG. 7.

Thus, in Steps S41 to S47, the BIOS selecting unit 33 selects the BIOS #1 corresponding to the entry with the row in the row column ID 150 of "1", and the BIOS #2 corresponding to the entry with the row in the row column ID 150 of "2", as candidate BIOSes 17. The BIOS selecting unit 33 then calculates weight sums for the these entries having one or more matched columns in the BIOS specifying table 15, in order to single out the most suitable BIOS 17.

For the entry with the row column ID 150 of "1", the weights are 10, 10, and 5 for matches of the board ID column 152, the CPU #1 column 153, and the Slot #1 column 156, respectively; hence, the weight sum is 10+10+5=25.

For the entry with the row column ID 150 of "2", the weights are 10 and 10 for matches of the board ID column 152 and the CPU #1 column 153, respectively; hence, the weight sum is 10+10=20.

Accordingly, in Step S48, the BIOS selecting unit 33 identifies the BIOS #1 (BIOS 17-1) as the one having the greater weight sum.

As set forth above, in the information processing system 1 as an example of the first embodiment, the BIOS storage 16 in the BIOS server 2 stores BIOSes 17 for a plurality of computers 3. The configuration information obtaining unit 32 in the BIOS control unit 12 obtains configuration information on hardware in a computer 3, and the BIOS selecting unit 33 then selects a suitable BIOS 17 to that computer 3, based on the obtained configuration information and the BIOS specifying table 15. The BIOS transmission unit 34 then sends the selected BIOS 17 to the computer 3.

Accordingly, in the information processing system 1 including dozens to hundreds of computers 3, update of and setting for BIOSes 17 can be automated while the information processing system 1 is being operated, thereby reducing the man-hours for managing the computers 3.

In a conventional information processing system wherein dozens to hundreds of computers are present, for updating a BIOS in the information processing system without stopping it, substantial man-hours are required to update a BIOS in each computer. For example, suppose that man-hours of 30 minutes·man is required to an update of and setting for a BIOS on a single computer, man-hours of 30 minutes·man× 5=2.5 hours·man will be needed for repeating that process in five computers. In contrast, in an example of this embodiment, a BIOS 17 can be updated on five computers 5, just with the same man-hours of 30 minutes·man, and hence the man-hours for that particular task can be significantly reduced.

Additionally, a situation can be avoided wherein a wrong BIOS 17 is loaded to computers 3 inadvertently by an operator, resulting in failures of the computers 3.

Furthermore, the BIOS selecting unit 33 records pairs of identification information (addresses) of the computers 3 and BIOSes 17 selected by the BIOS selecting unit 33, in the BIOS pairing table 14. Once the pairs of the addresses of the computers 3 and the BIOSes 17 are recorded in the BIOS pairing table 14, the BIOS transmission unit 34 can send a suitable BIOS 17 to a computer 3 without requiring comparison of configuration information of a computer 3 against the BIOS specifying table 15.

Furthermore, when there are multiple candidate BIOSes 17 for a single computer 3, the BIOS selecting unit 33 selects the most suitable BIOS 17, based on weight sums indicative of the similarities in hardware configuration.

This helps to further decrease the risk of a wrong BIOS 17 being loaded to computers 3 inadvertently, thereby further reducing any failures of the computers 3.

(B) Second Embodiment

In an example of the first embodiment described above, the BIOS management unit 11 selects a BIOS 17 which is to be sent (assigned) to a computer 3, based on the configuration information of the computer 3, and sends it to the computer 3.

In some operation scenarios of the information processing system 1, a system administrator may want to manually assign BIOS 17 to computers 3.

To meet such requirements, an information processing system 1' of an example of the second embodiment provides the system administrator of an option for manually assigning BIOS 17 to computers 3.

Figure 9:
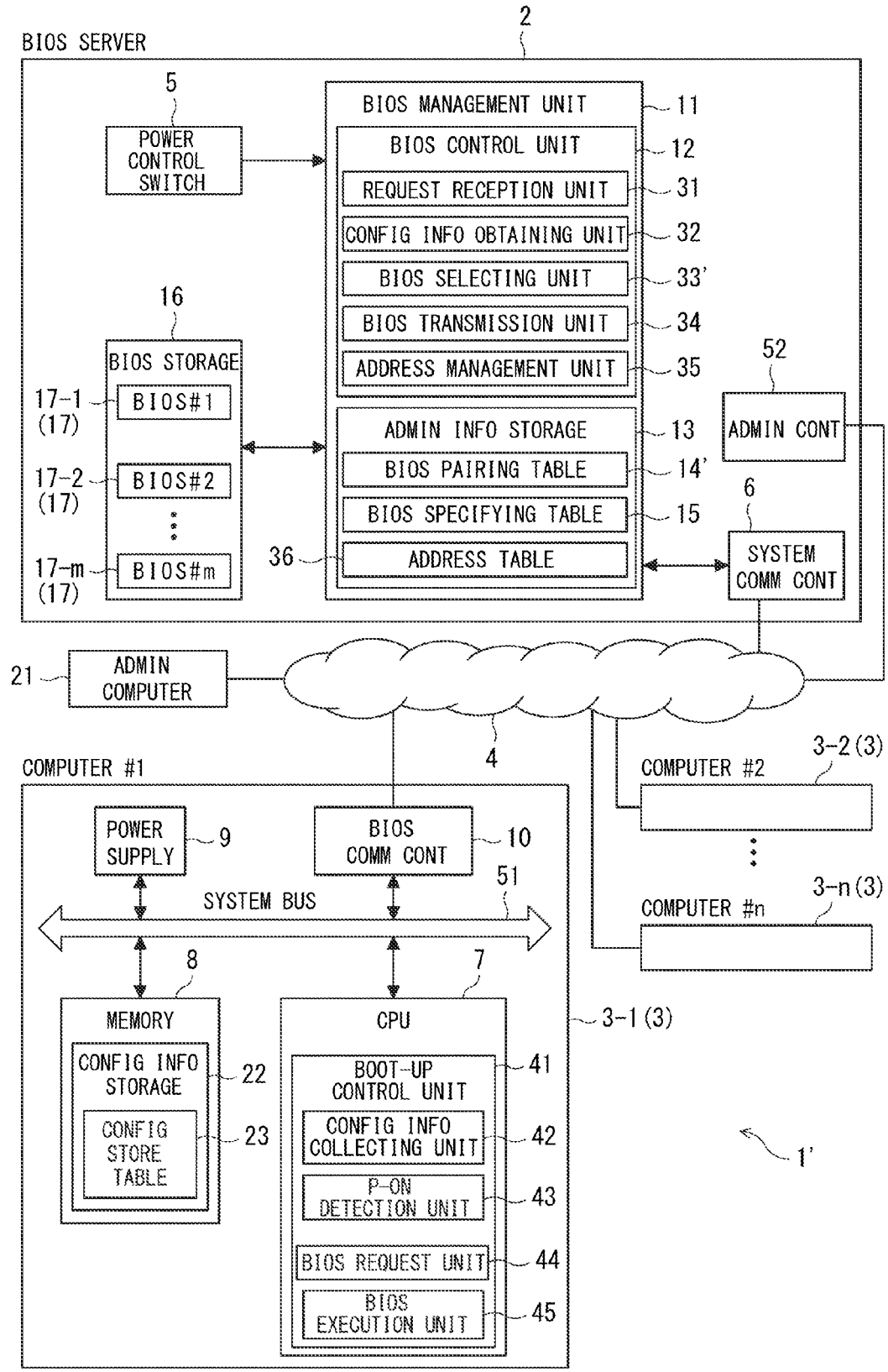
FIG. 9 is a schematic diagram illustrating a configuration of an information processing system as an example of a second embodiment.

FIG. 9 is a schematic diagram illustrating a configuration of the information processing system 1' as an example of a second embodiment.

The information processing system 1' is different from the information processing system 1 as an example of the first embodiment described above in that a BIOS server 2 includes an administration controller 52 and, that the information processing system 1' includes an administration computer 21. Further, it differs in that a BIOS pairing table 14' and a BIOS selecting unit 33' are provided in place of the BIOS pairing table 14 and the BIOS selecting unit 33, respectively. Other configurations and functions are similar to the configurations and the functions of the information processing system 1 as an example of the first embodiment described above, and detailed descriptions thereof is omitted.

The administration computer 21 is a commonly-used computer including a CPU and a memory (both not illustrated), for example. The administration computer 21 is connected to the BIOS server 2, via an administration controller 52 in a BIOS server 2, with the communication link 4. Using this administration computer 21, a system administrator can look up and update a BIOS pairing table 14' stored in an administration information storage 13 in the BIOS server 2.

The administration controller 52 in the BIOS server 2 is an interface that establishes communications with the administration computer 21 through the communication link 4.

Figure 10:
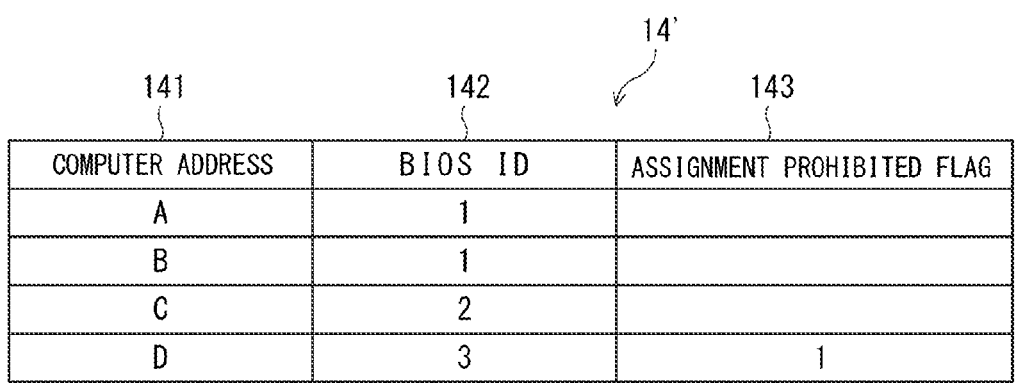
FIG. 10 is a diagram illustrating an example of a BIOS pairing table as an example of the second embodiment.

FIG. 10 is a diagram illustrating an example of the BIOS pairing table 14' as an example of the second embodiment.

In addition to the columns in the BIOS pairing table 14 as depicted in FIG. 2, the BIOS pairing table 14' includes an assignment prohibited flag 143. In other words, the BIOS pairing table 14' stores a computer address column 141, a BIOS ID column 142, and an assignment prohibited flag 143, which are related to each other.

The computer address column 141 stores an address of a computer 3, which is assigned by the address management unit 35, for uniquely identifying that computer 3.

The BIOS ID column 142 stores identification information (an ID or the like) that uniquely identifies a BIOS 17 assigned to the corresponding computer 3.

The assignment prohibited flag 143 stores a value indicating whether or not the BIOS management unit 11 is prohibited from assigning the BIOS 17 to the computer 3 identified by the value in the computer address column 141. The assignment prohibited flag 143 is set to a value "1", for example, for computers 3 for which the BIOS management unit 11 is not allowed to assign BIOSes 17. The assignment prohibited flag 143 may be set by a system administrator using the administration computer 21.

Figure 11:
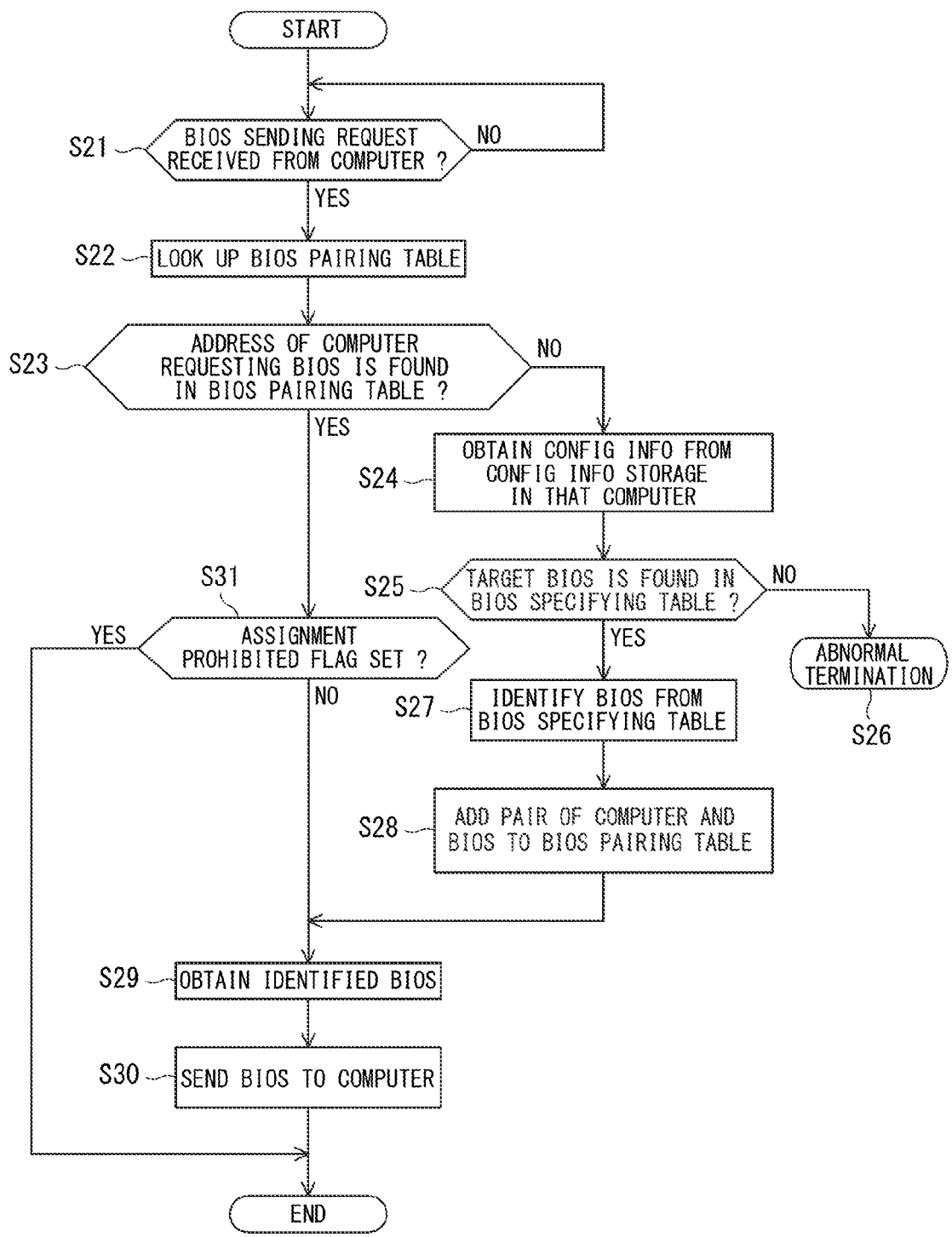
FIG. 11 is a flowchart of a BIOS identifying process by a BIOS selecting unit as an example of the second embodiment.

FIG. 11 is a flowchart (Steps S21 to S31) of a BIOS identifying process by a BIOS selecting unit as an example of the second embodiment. FIG. 11 includes Step S31, which is different from the flowchart depicted in FIG. 5.

The BIOS control unit 12 waits for a BIOS sending request from a computer 3, and determines whether or not a BIOS sending request is received from any of the computers 3 at every certain interval.

If no BIOS sending request is received from any of the computers 3 (refer to the NO route from Step S21), the BIOS control unit 12 returns to Step S21 where a BIOS sending request is waited for.

Otherwise, if a BIOS sending request is received from a computer 3 (refer to the YES route from Step S21), in Step S22, the BIOS selecting unit 33' in the BIOS control unit 12 looks up the BIOS pairing table 14'.

In Step S23, the BIOS selecting unit 33' checks whether or not the address of the computer 3 that has sent the BIOS sending request is found in the computer address column 141 in the BIOS pairing table 14'.

If the address of the computer 3 is found in the BIOS pairing table 14' (refer to the YES route from Step S23), in Step S31, the BIOS selecting unit 33' determines whether or not the assignment prohibited flag corresponding to the computer 3 is set to "1", in the BIOS pairing table 14'.

If the assignment prohibited flag is set to "1" (refer to the YES route from Step S31), the BIOS selecting unit 33' terminates this flow, without selecting a BIOS 17.

Otherwise, if the assignment prohibited flag is not set to "1" (refer to the NO route from Step S31), the flow moves to Step S29 (described later).

If the address of the computer 3 is not found in the BIOS pairing table 14' in Step S23 (refer to the NO route from Step S23), in Step S24, the configuration information obtaining unit 32 requests configuration information, to the computer 3 that has sent the BIOS sending request. In response, the configuration information collecting unit 42 in the boot-up control unit 41 in the computer 3 reads configuration information from the configuration store table 23 in the configuration information storage 22, and sends it to the configuration information obtaining unit 32.

In Step S25, the BIOS selecting unit 33' determines whether or not an entry corresponding to the configuration information of the computer 3, obtained by the configuration information obtaining unit 32 in Step S24, is found in the BIOS specifying table 15.

Upon making the determination, the BIOS selecting unit 33' executes a BIOS identifying process which has been described later with reference to FIG. 6, for identifying a BIOS 17 that is the most suitable to the computer 3, using the configuration information received from the computer 3 and the BIOS specifying table 15.

If any entry corresponding to the configuration information of the computer 3 is not found in the BIOS specifying table 15 (refer to the NO route from Step S25), in Step S26, the BIOS selecting unit 33' terminates this process in an abnormal termination. Additionally, the BIOS selecting unit 33' notifies a system administrator of the information processing system that no BIOS 17 corresponding to the configuration information of the computer 3 is found in the BIOS specifying table 15, by displaying a massage, for example. In response, the notified system administrator stores a suitable BIOS 17 to the new computer 3 into the BIOS storage 16, and then records a pair of the configuration information of the computer 3 and the identifier of the BIOS 17, in the BIOS specifying table 15, for example.

Otherwise, if an entry corresponding to the configuration information of the computer 3 is found in the BIOS specifying table 15 (refer to the YES route from Step S25), in Step S27, the BIOS selecting unit 33' identifies the BIOS 17 found in the BIOS specifying table 15, as the BIOS 17 to be assigned to the computer 3.

Then, in Step S28, the BIOS selecting unit 33' records a pair of the computer 3 and the identified BIOS 17, in the BIOS pairing table 14'.

Next, in Step S29, the BIOS transmission unit 34 reads the BIOS 17 identified by the BIOS selecting unit 33', from the BIOS storage 16.

In Step S30, the BIOS transmission unit 34 instructs the system communication controller 10 to send the BIOS 17 read in Step S29, to the computer 3.

As set forth above, in the information processing system 1' of an example of the second embodiment, a system administrator can set whether or not the BIOS management unit 11 is permitted to assign a BIOS 17 to computer 3, using the administration computer 21.

Hence, in addition to advantageous effects achieved by the information processing system 1 as an example of the first embodiment described above, the information processing system 1' of an example of the second embodiment is advantageous in that automatic assignments of BIOSes 17 to the computers 3 can be enabled or disabled. As a result, the information processing system 1' can be operated in a more flexible manner while reducing the man-hours for update of the BIOSes 17.

(C) Third Embodiment

In some operation scenarios of a computer 3, the system administrator may want to modify a configuration of a computer 3 while maintaining a connection of the computer 3 to a communication link 4.

To meet such requirements, an example of a third embodiment enables changes in configurations of hardware in computers 3 while maintaining connections between the computers 3 and a BIOS server 2.

Figure 12:
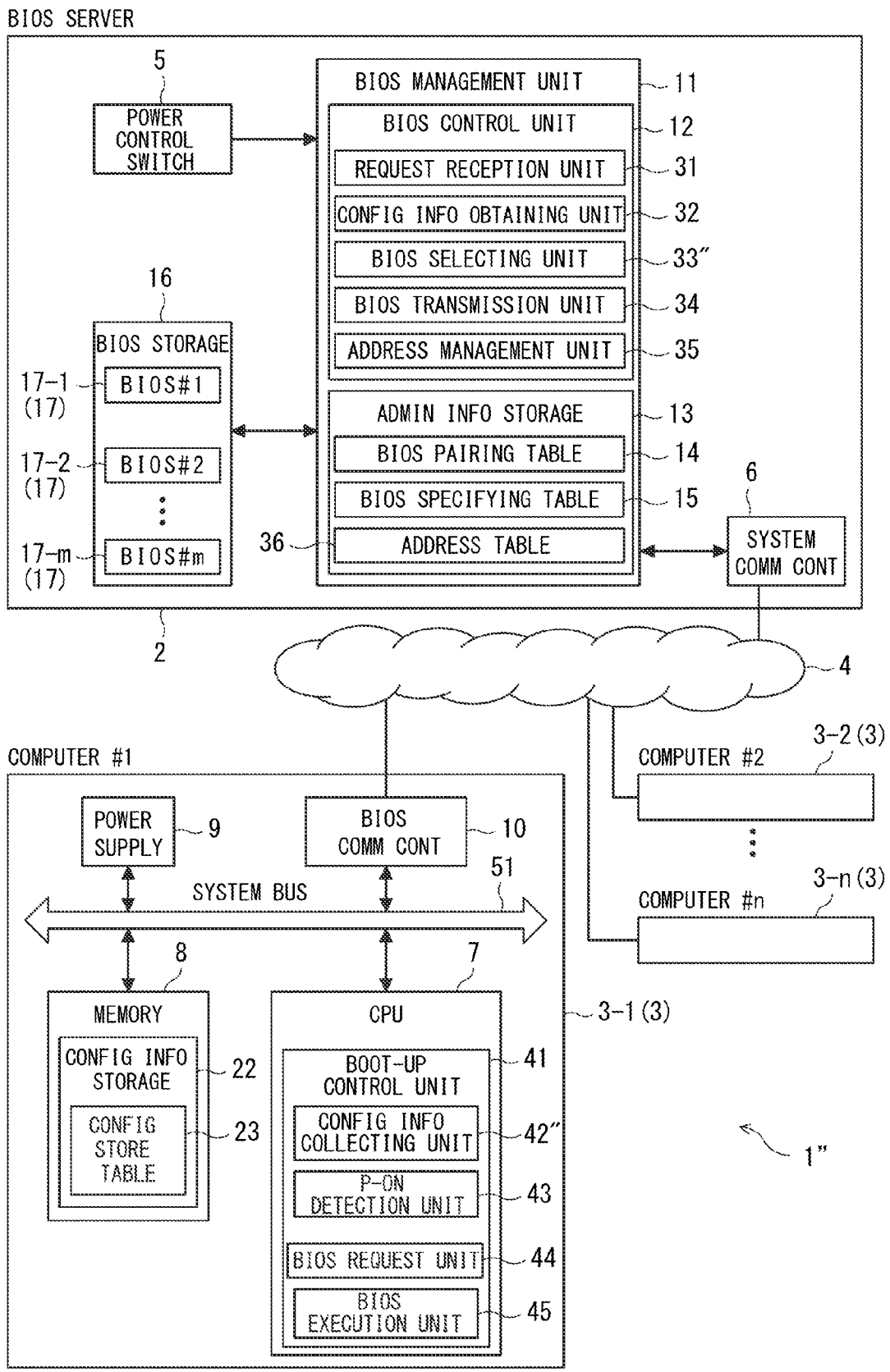
FIG. 12 is a schematic diagram illustrating a configuration of an information processing system as an example of a third embodiment.

FIG. 12 is a schematic diagram illustrating a configuration of an information processing system 1" as an example of a third embodiment.

The information processing system 1" is different from the information processing system 1 as an example of the first embodiment described above in that a BIOS selecting unit 33" and a configuration information collecting unit 42" are provided in place of the BIOS selecting unit 33 and the configuration information collecting unit 42, respectively. Other configurations and functions are similar to the configurations and the functions of the information processing system 1 as an example of the first embodiment described above, and detailed descriptions thereof is omitted.

Figure 13:
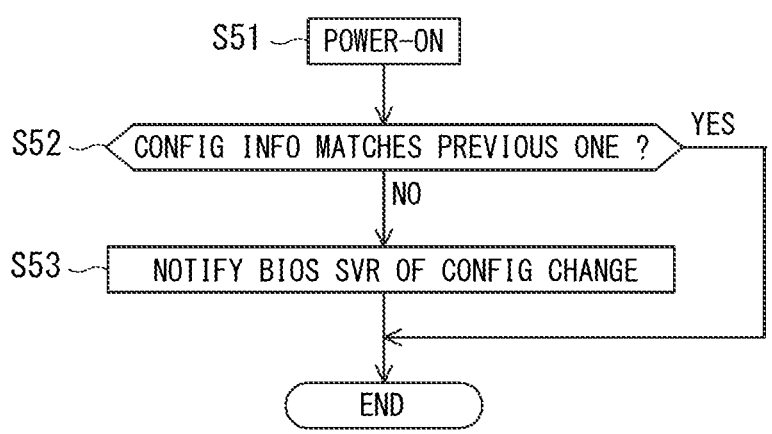
FIG. 13 is a flowchart of a process by a BIOS server upon a boot-up of a computer in the information processing system as an example of the third embodiment.

FIG. 13 is a flowchart (Steps S51 to S53) of a process by a BIOS server upon a boot-up of a computer 3 in the information processing system 1" as an example of the third embodiment.

In Step S51, the P-ON detection unit 43 in a computer 3 detects that the computer 3 is powered on, when a power-on signal is received from the BIOS server 2, or when a user operates a switch of the power supply 9 in the computer 3.

In Step S52, the configuration information collecting unit 42" collects configuration information from the computer 3. The collected configuration information is then compared against values in the configuration store table 23 to determine whether or not the collected configuration information matches the configuration information upon the previous boot-up of that computer 3.

If the configuration information matches (refer to the YES route from Step S52), this flow is terminated and a boot-up process is continued on the computer 3.

Otherwise, if the configuration information does not match (refer to the NO route from Step S52), in Step S53, the configuration information collecting unit 42" notifies the BIOS server 2 that the configuration information has been modified.

Figure 14:
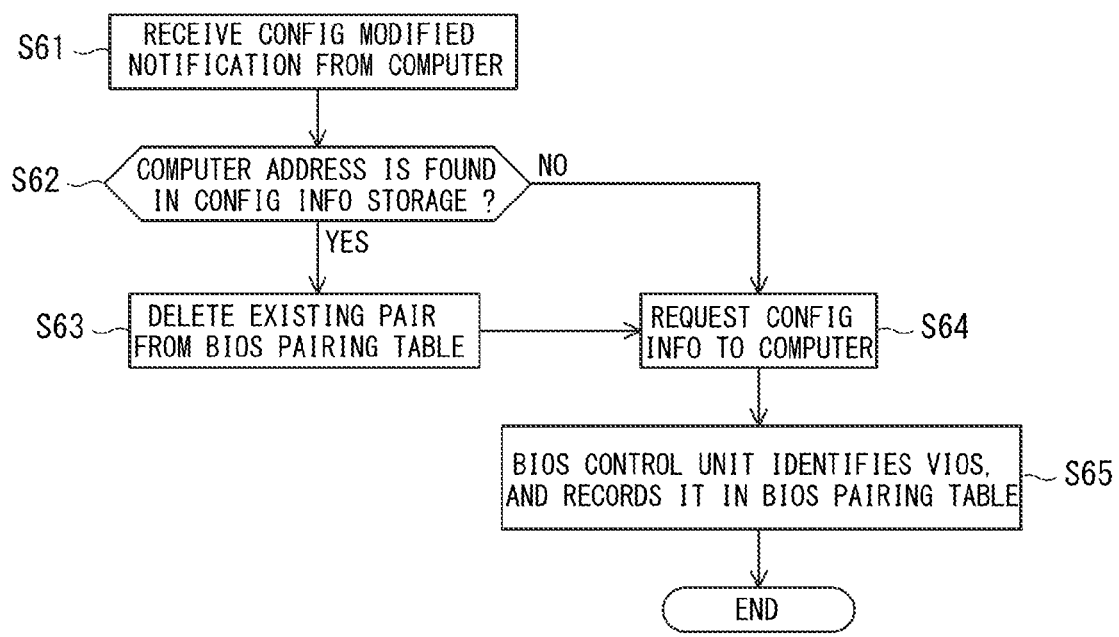
FIG. 14 a flowchart of a process by the BIOS server after the boot-up of a computer in the information processing system as an example of the third embodiment.

FIG. 14 a flowchart (Steps S61 to S65) of a process by the BIOS server 2 after a boot-up of the computer 3 in the information processing system 1" as an example of the third embodiment.

In Step S61, the request reception unit 31 in the BIOS control unit 12 in the BIOS server 2 receives the configuration change notification sent from the computer 3 in Step S53 in FIG. 13.

In Step S62, the BIOS selecting unit 33" determines whether or not the address of the computer 3 that sent the configuration change notification received in Step S61, is found in the BIOS pairing table 14.

If the computer address is not found in the BIOS pairing table 14 (refer to the NO route from Step S62), the flow moves to Step S64 (described later).

Otherwise, if the computer address is present in the BIOS pairing table 14 (refer to the YES route from Step S62), in Step S63, the BIOS selecting unit 33" deletes an entry corresponding to that computer 3, from the BIOS pairing table 14.

In Step S64, the configuration information obtaining unit 32 requests configuration information to the computer 3, and receives one from the computer 3.

In Step S65, the BIOS selecting unit 33" in the BIOS control unit 12 executes the BIOS identifying process described above with reference to FIG. 6, for identifying a BIOS 17 that is the most suitable to the computer 3, using the configuration information received in Step S64. The BIOS selecting unit 33" then records a pair of the address of the computer 3 and the identified BIOS 17, in the BIOS pairing table 14.

As set forth above, in the information processing system 1" as an example of the third embodiment, a boot-up control unit 41 in a computer 3 detects that the configuration of hardware in that computer 3 has been changed and notifies the BIOS server 2 of the change in the configuration. Based on this configuration change notification, the BIOS control unit 12 in the BIOS server 2 identifies a BIOS 17 that is the most suitable to the computer 3 wherein the configuration was modified, and sends it to the computer 3.

As a result, in addition to advantageous effects achieved by the information processing system 1 as an example of the first embodiment described above, the information processing system 1" as an example of the third embodiment is advantageous in that, after a configuration of a computer 3 is modified, a suitable BIOS 17 is sent to a computer 3 without any intervention by a system administrator. This can help to further reduce the man-hours for BIOS updates.

(D) Miscellaneous

The examples of the embodiments may be modified in various manners without departing from the concept of the examples of the embodiments.

For example, the second and third embodiments described above may be combined.

Although a BIOS 17 is sent to computer 3 from the BIOS server 2 in the first to third embodiments, the BIOS server 2 may send programs (OS, etc.) other than the BIOS 17, to the computer 3.

Note that as set forth above, a CPU (not illustrated) in the BIOS server 2 functions as the BIOS management unit 11 described above, namely, as the BIOS control unit 12, the request reception unit 31, the configuration information obtaining unit 32, the BIOS selecting units 33, 33', and 33", the BIOS transmission unit 34, and the address management unit 35, by executing a boot-up management program in the first to third embodiments described above.

A program (boot-up management program) for implementing the functions as the BIOS control unit 12, the request reception unit 31, the configuration information obtaining unit 32, the BIOS selecting units 33, 33', and 33", the BIOS transmission unit 34, and the address management unit 35 is provided in the form of programs recorded on a computer readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW, HD DVD), a Blu-ray disc, a magnetic disk, an optical disk, a magneto-optical disk, or the like. The computer 3 then reads a program from a storage medium (not illustrated) and use that program after transferring it to the internal storage apparatus or external storage apparatus or the like. Alternatively, the program may be recoded on a storage device (storage medium), for example, a magnetic disk, an optical disk, a magneto-optical disk, or the like, and the program may be provided from the storage device to the computer through a communication path.

Upon embodying the functions as the BIOS control unit 12, the request reception unit 31, the configuration information obtaining unit 32, the BIOS selecting units 33, 33', and 33", the BIOS transmission unit 34, and the address management unit 35, the boot-up management program stored in an internal storage device (a memory (not illustrated) or the like, in the BIOS server 2 in the embodiments) is executed by a microprocessor of the computer (a CPU (not illustrated) in the BIOS server 2 in the embodiments). In this case, the computers may alternatively read a program stored in a non-illustrated storage medium for executing it.

Furthermore, a memory (not illustrated) in the BIOS server 2 functions as the configuration information storage 13 that stores the BIOS pairing table 14, the BIOS specifying table 15, and the address table 36.

Note that as set forth above, a CPU 7 in a computer 3 functions as the boot-up control unit 41, the configuration information collecting units 42 and 42", the P-ON detection unit 43, the BIOS request unit 44, and the BIOS execution unit 45, by executing a boot-up management program in the first to third embodiments described above.

A program (boot-up management program) for implementing the functions as the boot-up control unit 41, the configuration information collecting units 42 and 42", the P-ON detection unit 43, the BIOS request unit 44, and the BIOS execution unit 45 is provided in the form of programs recorded on a computer readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW, HD DVD), a Blu-ray disc, a magnetic disk, an optical disk, a magneto-optical disk, or the like. The computers 3 then read a program from a storage medium (not illustrated) and use that program after transferring it to the internal storage apparatus or external storage apparatus or the like. Alternatively, the program may be recoded on a storage device (storage medium), for example, a magnetic disk, an optical disk, a magneto-optical disk, or the like, and the program may be provided from the storage device to the computers 3 through a communication path.

Upon embodying the functions as the boot-up control unit 41, the configuration information collecting units 42 and 42", the P-ON detection unit 43, the BIOS request unit 44, and the BIOS execution unit 45, the boot-up management program stored in an internal storage device (a memory 8 or the like, in a computer 3 in the embodiments) is executed by a microprocessor of the computer (a CPU 7 in the computer 3 in the embodiments). In this case, the computers may alternatively read a program stored in a non-illustrated storage medium for executing it.

Furthermore, the memory 8 in the computer 3 functions as the configuration information storage 22 that stores the configuration store table 23.

In accordance with the disclosed technique, management of boot-up programs for information processing apparatuses can be simplified, in an information processing system.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing system comprising:
a plurality of information processing apparatuses; and
a management apparatus that manages a plurality of boot-up programs used to boot up the plurality of information processing apparatuses, the management apparatus comprising:
a storage that stores the plurality of boot-up programs; and
a processor executing a process before booting-up an operating system in a first information processing apparatus among the plurality of information processing apparatuses, the process comprising:
obtaining configuration information of the first information processing apparatus;
extracting one or more boot-up programs corresponding to an identifier of main board specified by the configuration information from the plurality of boot-up programs stored in the storage;
selecting a first boot-up program corresponding to the first information processing apparatus from the extracted one or more boot-up programs, based on a value which is calculated by adding weighted values for each of hardware included in the first information processing apparatus, the weighted values being weighted for each of the hardware, and being added when the hardware specified by the configuration information matches hardware corresponding to the extracted one or more boot-up programs; and
sending the selected first boot-up program to the first information processing apparatus, the first information processing apparatus executing a process comprising:
receiving the first boot-up program sent by the processor; and booting-up the hardware included in the first information processing apparatus by using the received first boot-up program.

2. The information processing system according to claim 1, wherein the processor executing the process further comprising:
   receiving a boot-up program request, from the first information processing apparatus, and
   selecting, in response to the boot-up program request being received by the receiver, the boot-up program and the transmitter sends the selected boot-up program.

3. The information processing system according to claim 1, wherein the management apparatus further comprises an assignment prohibited flag, wherein the processor executing the process further comprises refraining from selecting the boot-up program of the first information processing apparatus when the assignment prohibited flag is set for the first information processing apparatus.

4. The information processing system according to claim 1, wherein each of the information processing apparatuses of the processor executing the process further comprising:
   determining, in response to detecting that the information processing apparatus is powered on, whether or not a configuration of that information processing apparatus has been changed since a previous power-on of the information processing apparatus, and
   notifying, in response to determining that the configuration has been changed, the management apparatus of the change in the configuration.

5. The information processing system according to claim 1, wherein the plurality of boot-up programs are basic input/output system programs for the plurality of information processing apparatuses.

6. The information processing system according to claim 1, wherein the processor further executing a process comprises, when a first value among the weighted values is a specific value indicating any hardware included in the first information apparatus can be used, selecting the first boot-up program without depending on whether the hardware specified by the obtained configuration information for the first value matches the hardware corresponding to the extracted one or more boot-up programs.

7. A management apparatus that manages a plurality of boot-up programs used to boot up a plurality of information processing apparatuses, the management apparatus comprising:
   a storage that stores the plurality of boot-up programs;
   a processor executing a process before booting-up an operating system in a first information processing apparatus among the plurality of information processing apparatuses, the process comprising:
      obtaining configuration information of the first information processing apparatus; extracting one or more boot-up programs corresponding to an identifier of main board specified by the obtained configuration information from the plurality of boot-up programs stored in the storage;
      selecting a first boot-up program corresponding to the first information processing apparatus from the extracted one or more boot-up programs, based on a value which is calculated by adding weighted values for each of hardware included in the first information processing apparatus, the weighted values being weighted for each of the hardware, and being added when the hardware specified by the obtained configuration information matches hardware corresponding to the extracted one or more boot-up programs; and
      sending the first boot-up program selected by the selector to the first information processing apparatus.

8. The management apparatus according to claim 7, wherein the processor executing the process further comprises:
   receiving a boot-up program request, from the first information processing apparatus, and
   selecting, in response to the boot-up program request being received by the receiver, the boot-up program and the transmitter sends the selected boot-up program.

9. The management apparatus according to claim 7, wherein the management apparatus further comprises an assignment prohibited flag, wherein the processor executing the process further comprises refraining from selecting the boot-up program of the first information processing apparatus when the assignment prohibited flag is set for the first information processing apparatus.

10. The management apparatus according to claim 7, wherein each of the information processing apparatuses of the processor executing the process further comprising:
    determining, in response to detecting that the information processing apparatus is powered on, determines whether or not a configuration of that information processing apparatus has been changed since a previous power-on of the information processing apparatus, and
    notifying, in response to determining that the configuration has been changed, the management apparatus of the change in the configuration.

11. The management apparatus according to claim 7, wherein the plurality of boot-up programs are basic input/output system programs for the plurality of information processing apparatuses.

12. The management apparatus according to claim 7, wherein the processor further executing a process comprises, when a first value among the weighted values is a specific value indicating any hardware included in the first information apparatus can be used, selecting the first boot-up program without depending on whether the hardware specified by the obtained configuration information for the first value matches the hardware corresponding to the extracted one or more boot-up programs.

13. A method of managing a plurality of boot-up programs used to boot up a plurality of information processing apparatuses in an information processing system which includes a management apparatus and the plurality of information processing apparatuses before booting-up an operating system in a first information processing apparatus among the plurality of information processing apparatuses, the method comprising:
   by the management apparatus,
   obtaining configuration information of the first information processing apparatus;
   extracting one or more boot-up programs corresponding to an identifier of main board specified by the obtained configuration information from the plurality of boot-up programs;
   selecting a first boot-up program corresponding to the first information processing apparatus from the extracted one or more boot-up programs, based on a value which is calculated by adding weighted values for each of hardware included in the first information processing apparatus, the weighted values being weighted for each of the hardware, and being added when the hardware specified by the obtained configuration information matches hardware corresponding to the extracted one or more boot-up programs; and sending the selected first boot-up program to the first information processing apparatus, by the first information processing apparatus, receiving the first boot-up program sent by the management apparatus; and booting-up the hardware included in the first information processing apparatus by using the received first boot-up program.

14. The method according to claim 13, further comprising receiving a boot-up program request, from the first information processing apparatus, in response to receiving the boot-up program request, the selecting the boot-up program and the sending the selected boot-up program are carried out.

15. The method according to claim 13, further comprising refraining from the selecting the boot-up program of the first information processing apparatus when an assignment prohibited flag is set for the first information processing apparatus.

16. The method according to claim 13, wherein each of the information processing apparatuses, in response to detecting that the information processing apparatus is powered on, determines whether or not a configuration of that information processing apparatus has been changed since a previous power-on of the information processing apparatus, and in response to determining that the configuration has been changed, the information processing apparatus notifies the management apparatus of the change in the configuration.

17. The method according to claim 13, wherein the plurality of boot-up programs are basic input/output system programs for the plurality of information processing apparatuses.

18. The method according to claim 13, further comprises, by the management apparatus, when a first value among the weighted values is a specific value indicating any hardware included in the first information apparatus can be used, selecting the first boot-up program without depending on whether the hardware specified by the obtained configuration information for the first value matches the hardware corresponding to the extracted one or more boot-up programs.

* * * * *